3,758,273
PROCESSES FOR STERILIZING POLYPROPYLENE OBJECTS

Richard Johnston and Raymond Clarke, Reading, Berkshire, England, assignors to The Gillette Company, Boston, Mass.
No Drawing. Filed Apr. 1, 1971, Ser. No. 130,516
Claims priority, application Great Britain, Apr. 3, 1970, 15,919/70
Int. Cl. A61l 1/00
U.S. Cl. 21—54 R                     5 Claims

ABSTRACT OF THE DISCLOSURE

If the sterilization of polypropylene objects by irradiation with γ-rays is carried out in a non-oxidizing (inert) atmosphere the brittleness and breakdown in the molecular weight of the polypropylene polymer which usually occurs as a result of the irradiation is substantially reduced. The results are further enhanced if the polypropylene objects are stored in the non-oxidizing atmosphere subsequent to irradiation.

---

This invention is concerned with a process for irradiating polypropylene articles with γ-rays.

Surgical instruments, such as hypodermic syringes, formed of moulded plastics materials are commonly sterilized by irradiation with γ-rays after or before they have been placed in individual air-tight packs. A plastics material which has many desirable properties for use in the manufacture of surgical instruments is polypropylene, but this material suffers from the disadvantage that it is degraded by γ-radiation, the degradation being manifested by a reduction in its molecular weight and a deterioration in its physical properties, in particular it becomes brittle.

Polypropylene can be protected to some extent against γ-radiation damage by incorporating antioxidants in the polymer, suitable antioxidants being hindered phenols, such as those sold under the trademarks "Ionox 330" (Shell Chemical Co.) and "Irganox 1010" (Geigy Co.), these being used on their own or in conjunction with synergists, such as dilaurylthiodipropionate. The use of such antioxidants has the disadvantage that polymers containing them have an undesirable yellow coloration after irradiation, the depth of the color increasing with the amount of antioxidant used.

We have now found that when polypropylene articles (not containing antioxidant) are irradiated with γ-rays while surrounded by a non-oxidizing atmosphere, the polypropylene undergoes far less radiation damage, the reduction in the latter being such that the physical properties of the polypropylene are not significantly impaired, and the polypropylene does not become discolored. This effect is enhanced if the polypropylene articles are maintained in the non-oxidizing atmosphere for an etxended period, say 7 days or more, after irradiation and before being exposed to the atmosphere.

The non-oxidizing atmosphere may be provided by vacuum or a non-oxidizing gas, such as nitrogen. The non-oxidizing atmosphere is conveniently provided around the the polypropylene articles during and, if desired after, γ-irradiation, by sealing the articles in envelopes formed of a gas- and liquid-impermeable, but γ-radiation permeable, material, such as glass or plastics laminates. Such envelopes preferably constitute the packs in which the articles are sold.

In order that the invention may be more fully understood, the following examples are comparative tests and given by way of illustration only:

COMPARATIVE TEST

Articles formed of polypropylene having a molecular weight of 224,000 and not containing any antioxidant were irradiated with γ-rays in air. The radiation dose was 2.5 mrads.

The molecular weight of the polymer was determined 1, 7 and 37 days after irradiation, the following results being obtained:

| Days after irradiation: | Mol. wt. |
|---|---|
| 1 | 62,000 |
| 7 | 43,000 |
| 37 | 28,000 |

EXAMPLE 1

Articles formed of the same polypropylene as used in the Comparative Test were sealed in glass ampoules under vacuum, irradiated with the same dose of γ-rays, and the ampoules were opened immediately after irradiation.

The molecular weight of the polymer was determined immediately on opening the ampoules and 3, 10 and 45 days thereafter, the following results being obtained:

| Days after opening: | Mol. wt. |
|---|---|
| 0 | 140,000 |
| 3 | 117,000 |
| 10 | 114,000 |
| 45 | 102,000 |

EXAMPLE 2

The procedure of Example 1 was repeated, except that the ampoules were stored, unopened, for 51 days after irradiation. The ampoules were then opened and the molecular weight of the polymer determined immediately on opening and 8 and 45 days thereafter, the following results being obtained:

| Days after opening: | Mol. wt. |
|---|---|
| 0 | 148,000 |
| 8 | 145,000 |
| 45 | 141,000 |

EXAMPLE 3

Three hypodermic syringes formed of the same polypropylene as used in the Comparative Test were sealed under nitrogen in individual gas- and liquid-impermeable sachets formed of cellulose/polyethylene laminate. The sachets were irradiated with the same dose of γ-rays as in the Comparative Test and left unopened for 45 days. The sachets were then opened and the molecular weight of the polymer was determined immediately. The following results were obtained:

| Syringe: | Mol. wt. |
|---|---|
| 1 | 133,000 |
| 2 | 141,000 |
| 3 | 148,000 |

EXAMPLE 4

The procedure of Example 3 was repeated except that the syringes were sealed under nitrogen in individual glass ampoules. On opening the ampoules after 45 days, the average molecular weight of the polymer was 159,000.

Having thus described the invention, what is claimed is:

1. In a process of sterilizing polypropylene objects through the use of γ-radiation, the improvement which comprises carrying out the irradiation step while said polypropylene object is held in a non-oxidizing atmosphere 2. A process as defined in claim 1, wherein said non-oxidizing atmosphere is maintained in a package for said object, said package being formed from material which is gas- and liquid-impermeable but γ-radiation permeable.

3. A process as defined in claim 1, wherein said polypropylene object is free of antioxidants.

4. A process as defined in claim 1, wherein said object is stored in said non-oxidizing atmosphere subsequent to irradiation.

5. A process as defined in claim 4, wherein said object is stored in said non-oxidizing atmosphere for at least 7 days subsequent to irradiation.

References Cited
UNITED STATES PATENTS

| | | | |
|---|---|---|---|
| 2,904,392 | 9/1959 | Pomerantz et al. | 21—54 R |
| 3,537,967 | 11/1970 | Kelley et al. | 250—106 R X |

BARRY S. RICHMAN, Primary Examiner

U.S. Cl. X.R.

21—82 R, 82 H; 204—159.2; 250—106 R